US012162266B2

(12) United States Patent
Onuki

(10) Patent No.: US 12,162,266 B2
(45) Date of Patent: Dec. 10, 2024

(54) DRYING APPARATUS AND IMAGE FORMING SYSTEM

(71) Applicant: Hajime Onuki, Kanagawa (JP)

(72) Inventor: Hajime Onuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 252 days.

(21) Appl. No.: 17/956,829

(22) Filed: Sep. 30, 2022

(65) Prior Publication Data

US 2023/0139189 A1 May 4, 2023

(30) Foreign Application Priority Data

Nov. 2, 2021 (JP) ................................. 2021-179193

(51) Int. Cl.
*B41J 11/00* (2006.01)

(52) U.S. Cl.
CPC ............................... *B41J 11/00222* (2021.01)

(58) Field of Classification Search
CPC ......................... B41J 11/00222; B41J 11/0022
See application file for complete search history.

(56) References Cited

U.S. PATENT DOCUMENTS

2020/0207121 A1* 7/2020 Washio ................ B41J 11/0022

FOREIGN PATENT DOCUMENTS

| | | |
|---|---|---|
| JP | 61-059911 | 3/1986 |
| JP | 6-071882 | 3/1994 |
| JP | 2012-091320 | 5/2012 |
| JP | 2014-014981 | 1/2014 |
| JP | 2020-002473 | 1/2020 |
| JP | 2020-104320 | 7/2020 |
| JP | 2021-059099 | 4/2021 |
| JP | 2021-062484 | 4/2021 |

* cited by examiner

*Primary Examiner* — Bradley W Thies
(74) *Attorney, Agent, or Firm* — XSENSUS LLP

(57) ABSTRACT

A drying apparatus includes a drying chamber to dry a drying-target medium with a gas maintained at a preset temperature, and the drying-target medium is a medium to be dried. The drying chamber takes in the gas from a suction chamber into which a gas is sucked in through an intake hole in a retaining face on which the drying-target medium is retained with the gas sucked into the suction chamber.

8 Claims, 7 Drawing Sheets

DRYING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-179193, filed on Nov. 2, 2021, in the Japan Patent Office, the entire disclosure of which is hereby incorporated by reference herein.

BACKGROUND

Technical Field

The present disclosure relates to a drying apparatus and an image forming system.

Related Art

Drying apparatuses are known in the related art for drying a recording medium on which an image is to be formed using a heated gas in a drying chamber.

For example, a drying apparatus including a drying furnace (drying chamber) configured such that a recording medium on which an image is printed by an image forming apparatus is dried with hot air blown from a hot air blower is known. The hot air is generated by heating outside air taken in by an intake fan with a heater.

SUMMARY

In one aspect, a drying apparatus includes a drying chamber to dry a drying-target medium with a gas maintained at a preset temperature, and the drying-target medium is a medium to be dried. The drying chamber takes in the gas from a suction chamber into which a gas is sucked in through an intake hole formed in a retaining face on which the drying-target medium is retained with the gas sucked into the suction chamber.

In another aspect, an image forming system includes an image forming apparatus and the drying apparatus described above. The image forming apparatus includes a medium retainer including the suction chamber and the retaining face; and an image forming engine to form an image on a recording medium being the drying-target medium. The drying apparatus dries the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
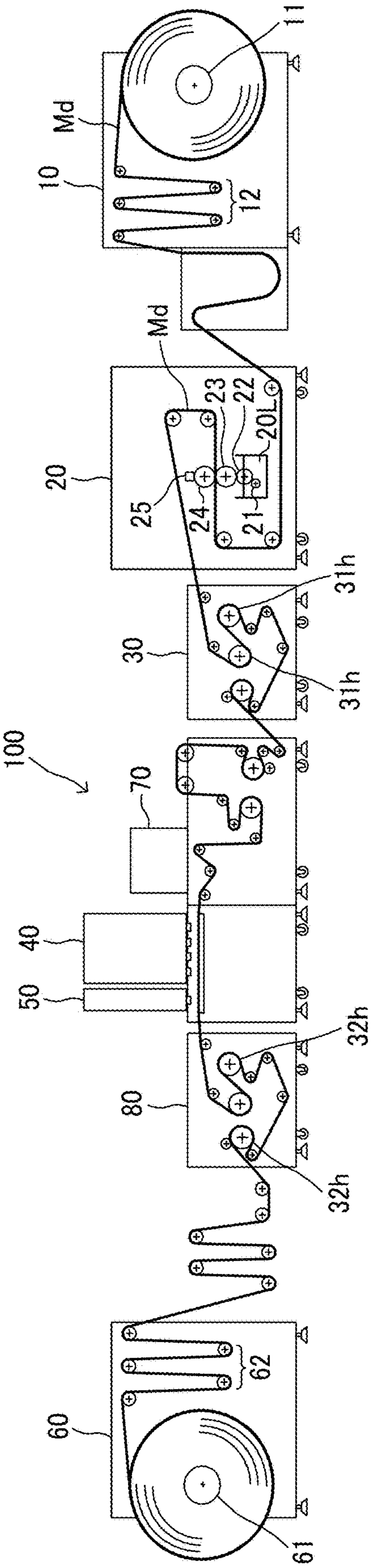
FIG. 1 is a diagram illustrating the general arrangement of an image forming system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

First Embodiment

An example of an image forming system including a drying apparatus according to a first embodiment of the present disclosure will be described hereinafter with reference to the drawings.

The image forming system according to the first embodiment includes, for example recording beads that discharge inks of four colors, namely, black (K), cyan (C), magenta (M), and yellow (Y), and form an image with the inks on a recording medium. However, the image forming system to which aspects of the present disclosure are applicable is not limited thereto. In one example, the image forming system further includes recording heads for inks of green (G), red (R), light cyan (LC), and/or other colors. In another example, the image forming system includes only a recording head for black (K) ink. In the following description, symbols with suffixes "K," "C," "M." and "Y" correspond to black, cyan, magenta, and yellow, respectively. The image forming system may be based on another image forming method such as an electrophotographic method.

In the first embodiment, a continuous sheet wound on a roll (hereinafter referred to as "roll sheet Md") is used as a recording medium. In some embodiments of the present disclosure, the image forming system forms an image on a recording medium other than a roll sheet. In an embodiment of the present disclosure, the image forming system may form an image on a cut sheet. In one or more embodiments of the present disclosure, the image forming system is used to form an image on a recording medium, examples of which include a sheet of plain paper, a sheet of high-quality paper, a sheet of thin paper, a sheet of thick paper, a sheet of recording paper, a roll sheet, an overhead projector (OHP) sheet, a synthetic resin film, a thin metal film, and any other recording medium having a surface on which an image is to be formed using ink, toner, or the like. As used herein, the term "roll sheet" refers to a continuous sheet (continuous form) having sets of perforations at predetermined intervals to cut the sheet into pieces along the sets of perforations. Each page of the roll sheet is, for example, an area defined between two sets of perforations formed at predetermined intervals.

As illustrated in FIG. 1, an image forming system 100 according to the first embodiment includes a loading unit 10 and a pre-treatment unit 20. The loading unit 10 loads the roll sheet Md. The pre-treatment unit 20 applies pre-treatment to the loaded roll sheet Md. The image forming system 100 further includes an image forming unit 40, a post-treatment unit 50, and an unloading unit 60. The image forming unit 40 is an image forming apparatus that forms an image on a surface of the roll sheet Md. The post-treatment unit 50 applies post-treatment to the roll sheet Md on which the image is formed. The unloading unit 60 unloads the roll sheet Md to which post-treatment is applied. The image forming system 100 further includes a pre-treatment drying unit 30 and a post-treatment drying unit 80. The pre-treatment drying unit 30 dries the roll sheet Md to which pre-treatment is applied. The post-treatment drying unit 80 is a drying apparatus that dries the roll sheet Md after post-treatment is applied to the roll sheet Md. The image forming system 100 further includes a controller 70 that controls the operation of the image forming system 100. The controller 70 is, for example, a general-purpose computer.

In the image forming system 100 according to the first embodiment, the roll sheet Md is loaded into the image forming system 100 by the loading unit 10, and a surface of the roll sheet Md is subjected to pre-treatment and drying by the pre-treatment unit 20 and the pre-treatment drying unit 30, respectively. In the image forming system 100, the image forming unit 40 forms an image on the surface of the roll sheet Md that is subjected to pre-treatment and drying. In the image forming system 100, furthermore, in the first embodiment, the roll sheet Md on which the image is formed is subjected to post-treatment and drying by the post-treatment unit 50 and the post-treatment drying unit 80, respectively. In the image forming system 100, then, the unloading unit 60 winds the roll sheet Md.

Next, the components of the image forming system 100 according to the first embodiment will be described in detail.

In one or more embodiments of the present disclosure, the image forming system 100 does not include one or more of the pre-treatment unit 20 and the like described below, depending on the type of a recording medium on which an image is to be formed.

The loading unit 10 conveys the recording medium to the pre-treatment unit 20 and the like. In the first embodiment, the loading unit 10 includes a sheet feeder 11, a plurality of conveyance rollers 12, and the like. The loading unit 10 loads the roll sheet Md wound around and held by a sheet feeding roll of the sheet feeder 11 by using the conveyance rollers 12 and the like and conveys the roll sheet Md to the pre-treatment unit 20 and the like described below.

The pre-treatment unit 20 applies treatment to the recording medium before an image is formed on the recording medium. In the first embodiment, the pre-treatment unit 20 applies pre-treatment to a surface of the roll sheet Md loaded by the loading unit 10 with a pre-treatment liquid. In the first embodiment, the pre-treatment is a treatment for uniformly applying a pre-treatment liquid described below, which has a function of aggregating ink, to the surface of the roll sheet Md (i.e., the recording medium). Through the treatment, in the formation of an image on paper dedicated to inkjet printers or a recording medium other than inkjet dedicated paper, in the image forming system 100, a pre-treatment liquid having a function of aggregating ink can adhere to the surface of the recording medium using the pre-treatment unit 20 before an image is formed on the recording medium. As a result, the image forming system 100 can reduce quality degradation in an image to be formed, such as bleed-through, density degradation, tone degradation, and show-through, and also reduce issues related to waterfastness, weather-fastness, and other types of fastness of image. Accordingly, the quality of an image formed thereafter can be improved.

As illustrated in FIG. 1, the pre-treatment unit 20 uses a roll coating method to apply a stored pre-treatment liquid 20L to the surface of the roll sheet Md loaded into the pre-treatment unit 20 by the loading unit 10. More specifically, in the pre-treatment unit 20, first, a stirring roller 21 and a thinning roller 22 are used to transfer the pre-treatment liquid 20L onto a surface of an application roller 23 in a thin film form. The application roller 23 rotates while being pressed against a rotating platen roller 24, and the roll sheet Md is conveyed into a gap between the application roller 23 and the platen roller 24 to apply the pre-treatment liquid 20L to the surface of the roll sheet Md.

The pre-treatment unit 20 uses a pressure regulator 25 to control a nip pressure for applying the pre-treatment liquid 20L. The nip pressure is a pressure acting on a position at which the application roller 23 and the platen roller 24 come into contact with each other. The pre-treatment unit 20 may control the rotational speeds of the application roller 23 and the platen roller 24. As a result, the pre-treatment unit 20 can change the rotational speeds of the application roller 23 and the like, and can change the nip pressure using the pressure regulator 25. In addition, the pre-treatment unit 20 can more accurately control the amount of application of the pre-treatment liquid 20L (such as the film thickness, the amount of liquid, the amount of adhesion, or the amount of dry adhesion). This makes it possible to apply the pre-treatment liquid 20L to the surface of the roll sheet Md (i.e., the recording medium) in an amount of application suitable for subsequent image formation and post-treatment.

The pre-treatment drying unit 30 dries the recording medium by heating or the like. More specifically, the pre-treatment drying unit 30 according to the first embodiment heats heat rollers 31*h* to, for example, 40° C. to 100° C., and conveys the roll sheet Md to which the pre-treatment liquid 20L is applied while bringing the roll sheet Md into contact with the heat rollers 31*h*. As a result, the pre-treatment drying unit 30 can evaporate the moisture of the pre-treatment liquid 20L adhering to the roll sheet Md and dry (the pre-treatment liquid 20L of) the roll sheet Md.

To increase the drying effect, as illustrated in FIG. 1, the pre-treatment drying unit 30 according to the first embodiment preferably includes a plurality of heat rollers 31*h* arranged in multiple stages. In this configuration, to weaken the drying strength, the heat roller temperature is decreased. For example, the heat roller temperature is set to about 40° C. to 80° C. In one example, some of the beat rollers 31*h* are heated while the other heat rollers 31*h* are not heated. To increase the drying strength, the number of heat rollers 31*h* used is increased, or the heat roller temperature is increased. As described above, the drying strength can be controlled by changing the temperature of the heat rollers 31*h* and/or the number of heat rollers 31*h* used.

The pre-treatment drying unit 30 may perform drying using a method other than using the heat rollers 31*h*.

For example, the pre-treatment drying unit 30 may use infrared drying, microwave drying, hot-air drying, or any other drying method. Alternatively, the pre-treatment drying unit 30 may use a plurality of drying methods in combination. In one example, the pre-treatment drying unit 30 may beat the roll sheet Md (i.e., the recording medium) (preheating step) before the pre-treatment unit 20 applies the pre-treatment liquid 20L to the roll sheet Md. Like the post-treatment drying unit 80 described below, the pre-treatment drying unit 30 may be a drying apparatus that dries the recording medium with a heated gas in a drying chamber.

The image forming unit 40 is an image forming apparatus that forms an image on a recording medium. In the first embodiment, the image forming unit 40 employs an inkjet recording method in which ink is discharged onto the roll sheet Md, which is dried by the pre-treatment drying unit 30, to form an image on the surface of the roll sheet Md.

Figure 2A:
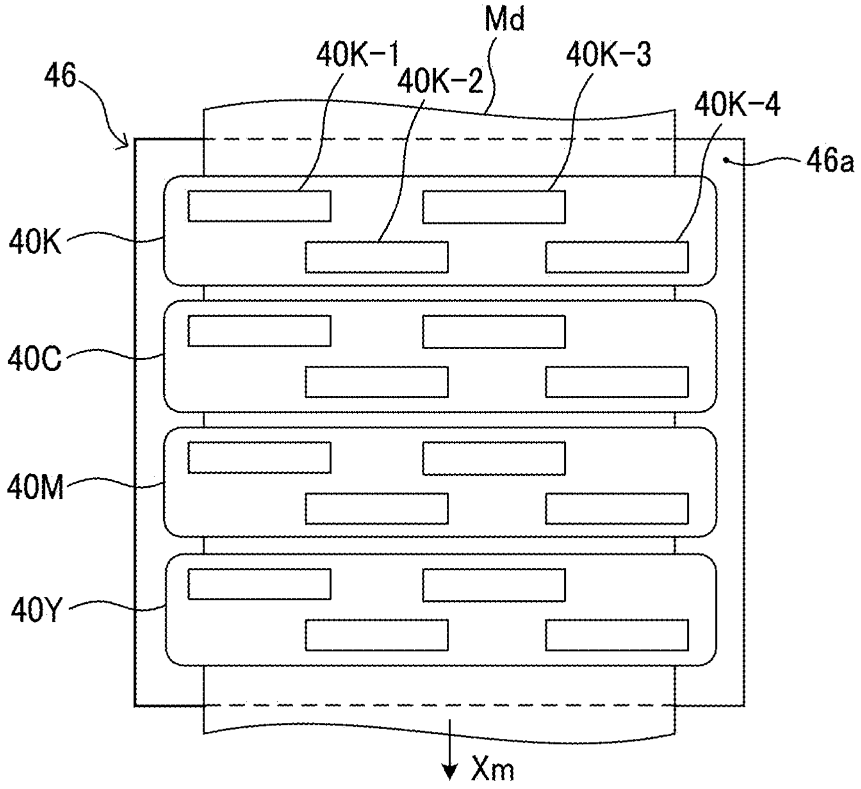
FIG. 2A is a schematic plan view of an example of four recording heads of an image forming unit in the image forming system according to the first embodiment.
Figure 2B:
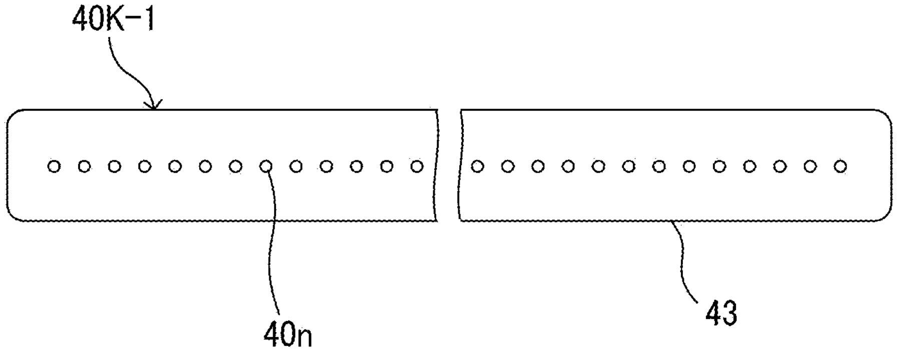
FIG. 2B is a schematic plan view of one of four head units of a recording head for black (K) ink according to the first embodiment.

FIG. 2A is a schematic plan view of an example of four recording heads 40K, 40C, 40M, and 40Y of the image forming unit 40 according to the first embodiment. FIG. 2B is a schematic plan view of one of four head units 40K-1, 40K-2, 40K-3, and 40K-4 of the recording head 40K for black (K) ink.

As illustrated in FIG. 2A, the image forming unit 40 includes an air-suction type sheet retainer 46 (a medium retainer) at a position facing the recording heads 40K, 40C, 40M, and 40Y with the roll sheet Md therebetween. The sheet retainer 46 includes a retaining face 46*a* having intake holes 46*b* (see FIG. 4) and retains the roll sheet Md on the retaining face 46*a* with air sucked in from the intake holes 46*b*. This prevents the roll sheet Md on which the inks discharged from the recording heads 40K, 40C, 40M, and 40Y land from floating from the retaining face 46*a* of the sheet retainer 46. As a result, a high-quality image can be formed.

The image forming unit 40 may include a full-line recording head. In the image forming unit 40 according to the first embodiment, the four recording heads 40K, 40C, 40M, and 40Y, which correspond to black (K), cyan (C), magenta (M), and yellow (Y), respectively, are arranged in this order from the upstream side to the downstream side in a conveyance direction Xm of a recording medium.

The recording head 40K for black (K) ink includes four head units 40K-1, 40K-2, 40K-3, and 40K-4 arranged in a staggered manner in a direction orthogonal to the conveyance direction Xm of the roll sheet Md. This configuration allows the image forming unit 40 to form an image on an entire image forming area (print area) of the roll sheet Md (i.e., the recording medium) in its width direction (direction orthogonal to the conveyance direction Xm of the roll sheet Md).

As illustrated in FIG. 2B, the head unit 40K-1 includes a plurality of nozzles 40*n*, which are discharge ports, in a nozzle surface (an outer face of a nozzle plate 43 illustrated in FIG. 3A described below). The plurality of nozzles 40*n* are arranged in a line along the longitudinal direction of the head unit 40K-1 to form a nozzle row. The head unit 40K-1 may include a plurality of nozzle rows.

Figure 3A:
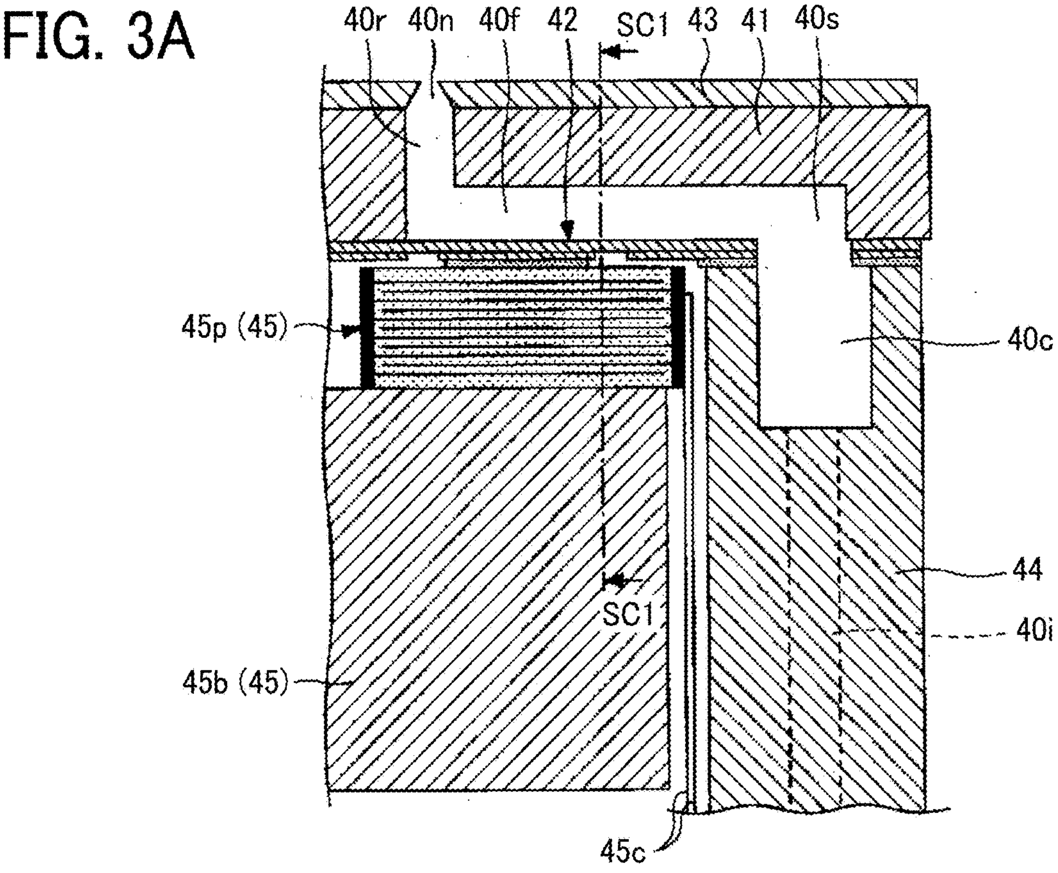
FIG. 3A is a schematic cross-sectional view of a portion of the head unit illustrated in FIG. 2B, taken in a longitudinal direction of a liquid chamber.
Figure 3B:
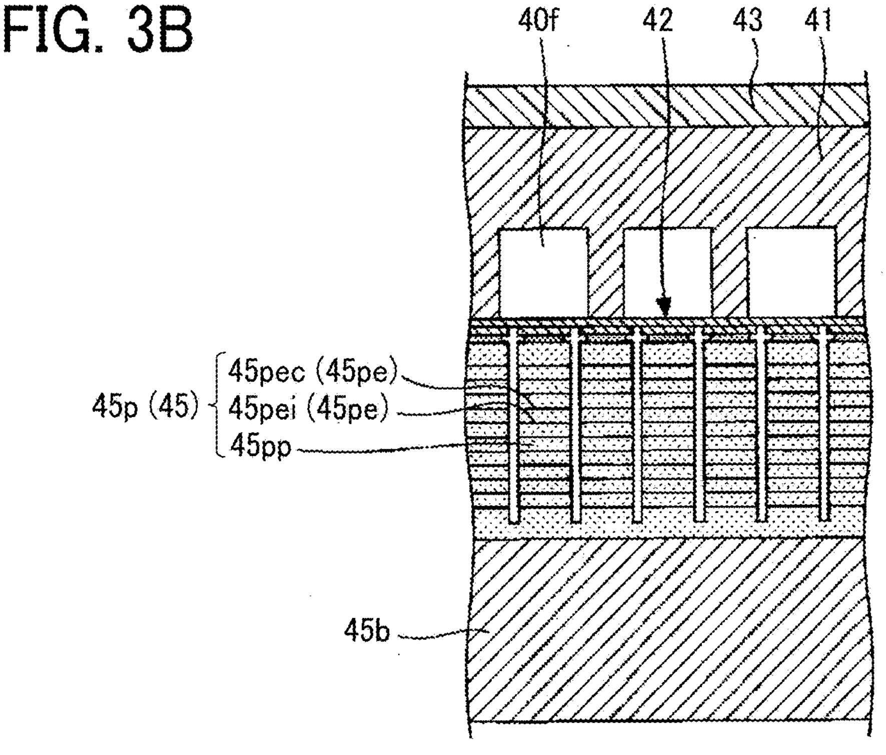
FIG. 3B is a schematic cross-sectional view of the portion of the head unit, taken along line SC1 illustrated in FIG. 3A, that is, in a direction that is orthogonal to the longitudinal direction of the liquid chamber and that is a direction in which nozzles are arranged.

FIG. 3A is a schematic cross-sectional view of a portion of the head unit 40K-1, taken in the longitudinal direction of liquid chambers 40*f*. FIG. 3B is a schematic cross-sectional view of a portion of the head unit 40K-1, taken along line SC1 illustrated in FIG. 3A, that is, in a direction orthogonal to the longitudinal direction of the liquid chambers 40*f* (i.e., in the direction in which the nozzles 40*n* are arranged).

As illustrated in FIG. 3A, the head unit 40K-1 includes a channel substrate 41, a diaphragm 42, a nozzle plate 43, and a frame member 44. The channel substrate 41 forms a channel of ink to be discharged. The diaphragm 42 is joined to a lower surface of the channel substrate 41 in FIG. 3A (an inner direction of the head unit 40K-1). The nozzle plate 43 is joined to an upper surface of the channel substrate 41 in FIG. 3A (an outer direction of the head unit 40K-1). The frame member 44 holds the periphery of the diaphragm 42. The head unit 40K-1 further includes a pressure generator 45 for deforming the diaphragm 42.

In the head unit 40K-1 according to the first embodiment, the channel substrate 41, the diaphragm 42, and the nozzle plate 43 are stacked on one another to form a nozzle communication path 40*r* and a liquid chamber 40*f*, which are channels communicating with a corresponding one of the nozzles 40*n*. In the head unit 40K-1, the frame member 44 is further stacked to form an ink inflow port 40*s* for supplying ink to the liquid chamber 40*f*, a common liquid chamber 40*c* for supplying ink to the liquid chamber 40*f*, a housing that accommodates the pressure generator 45, and an ink supply port 40*i* for supplying ink from outside the head unit 40K-1 to the common liquid chamber 40*c*, and the like.

The head unit 40K-1 can deform (flexurally deform) the diaphragm 42 using the pressure generator 45. With this configuration, in the head unit 40K-1, the volume of the liquid chamber 40*f* can be changed to change the pressure acting on the ink in the liquid chamber 40*f*. As a result, the head unit 40K-1 can discharge ink from the corresponding one of the nozzles 40*n*.

The pressure generator 45 may include an electromechanical transducer element. The pressure generator 45 includes piezoelectric elements 45*p*, a base substrate 45*b* to which the piezoelectric elements 45*p* are bonded and secured, and pillars arranged in gaps between adjacent piezoelectric elements 45*p*. In the first embodiment, each of the piezoelectric elements 45*p* is an electromechanical transducer element. The pressure generator 45 further includes flexible printed circuit (FPC) cables 45*c* for coupling the piezoelectric elements 45*p* to a drive circuit (drive integrated circuit (IC)), and the like.

As illustrated in FIG. 3B, each of the piezoelectric elements 45*p* may be a laminated piezoelectric element (lead zirconate titanate (PZT)) in which piezoelectric materials 45*pp* and internal electrodes 45*pe* are alternately stacked on one another. The internal electrodes 45*pe* include a plurality of individual electrodes 45*pei* and a plurality of common electrodes 45*pec*. In the first embodiment, the internal electrodes 45*pe* are configured such that the individual electrodes 45*pei* or the common electrodes 45*pec* are alternately coupled to end faces of the piezoelectric materials 45*pp*.

In the piezoelectric elements 45*p* according to the first embodiment, d33 direction is used as the piezoelectric direction of the piezoelectric materials 45*pp*. Accordingly, the pressure generator 45 can pressurize or depressurize the ink in the liquid chambers 40*f* by using the piezoelectric effects (displacements in d33 direction) of the piezoelectric elements 45*p*. The pressure generator 45 may pressurize or depressurize the ink in the liquid chambers 40*f* by using the displacements of the piezoelectric elements 45*p* in d31 direction. The pressure generator 45 may include one row of piezoelectric elements for each of the nozzles 40*n*. The piezoelectric element members (the piezoelectric elements 45*p*) may be divided to form the pillars at the same time as the piezoelectric elements 45*p*. That is, in the head unit 40K-1, no voltage is applied to the piezoelectric elements 45*p* such that the piezoelectric element members can be used as the pillars.

The following describes a specific operation (pull-push discharge operation) of discharging ink from the nozzles 40*n*.

First, the head unit 40K-1 reduces the voltage to be applied to the piezoelectric elements 45*p* (the pressure generator 45) from a reference potential to reduce the size of the piezoelectric elements 45*p* in the stacking direction thereof, and flexurally deforms the diaphragm 42. As a result, the volume of the liquid chambers 40*f* increases (or expands), and ink flows into the liquid chambers 40*f* from the common liquid chambers 40*c*. Then, the head unit 40K-1 increases the voltage to be applied to the piezoelectric elements 45*p* to expand the piezoelectric elements 45*p* in the stacking direction. As a result, the diaphragm 42 is deformed in the direction of the nozzles 40*n* to reduce (or shrink) the volume of the liquid chambers 40*f*. Consequently, a pressure is applied to the ink in the liquid chambers 40*f*, and the ink is discharged (ejected) from the nozzles 40*n*. Then, the voltage to be applied to the piezoelectric elements 45*p* is returned to the reference potential to return (or restore) the diaphragm 42 to the initial position. The expansion of the liquid chambers 40*f* reduces the pressure in the liquid chambers 40*f*, and the liquid chambers 40*f* are filled (or replenished) with ink from the common liquid chambers 40*c*. After the vibration of the meniscus surface of each of the nozzles 40*n* is attenuated (or stabilized), the operation proceeds to the next operation for discharging ink, and the operation described above is repeatedly performed.

The method for driving the head unit 40K-1 is not limited to the example described above, namely, the pull-push discharge operation. That is, the recording head 40K is driven in such a manner that a voltage (drive waveform) to be applied to the piezoelectric elements 45*p* is controlled to perform pull discharge, push discharge, or the like.

The pressure generator 45 is not limited to the example (the piezoelectric elements 45*p*) described above. That is, the pressure generator 45 may be of a type (so-called thermal type) in which ink in each of the liquid chambers 40*f* is heated using a heat element to generate a bubble (see, for example, Japanese Unexamined Patent Application Publication No. 61-59911). Alternatively, the pressure generator 45 may be of a type (so-called electrostatic type) in which a diaphragm and an electrode are arranged opposite to each other on the wall surface of each of the liquid chambers 40*f* and the diaphragm is deformed by an electrostatic force generated between the diaphragm and the electrode (see, for example, Japanese Unexamined Patent Application Publication No. 6-71882).

The configuration and operation of the other head units 40K-2, 40K-3, and 40K-4 are similar to those of the head unit 40K-1 described above and will not be described herein.

The configuration and operation of the other recording heads 40C, 40M, and 40Y are similar to those of the recording head 40K for black (K) ink and will not be described herein.

With the configuration described above, the image forming system 100 according to the first embodiment can form a black-and-white or full-color image in an entire image forming area using the image forming unit 40 (the four recording heads 40K, 40C, 40M, and 40Y) in a single conveyance operation of the recording medium (the roll sheet Md).

The post-treatment unit 50 applies treatment to the recording medium after an image is formed on the recording medium. In the first embodiment, the post-treatment unit 50 applies post-treatment to the surface of the roll sheet Md on which an image is formed by the image forming unit 40 with a post-treatment liquid. In the first embodiment, the post-treatment is a treatment for applying (discharging) a post-treatment liquid to the surface of the roll sheet Md (i.e., the recording medium). The post-treatment liquid is formed in a shape such as a spot shape or a stripe shape. As a result, the recording medium with an image formed thereon can have improved scratch resistance and gloss, and improved storage stability (such as waterfastness, lightfastness, and gasfastness) and the like.

The post-treatment liquid adheres to, in at least a portion of the recording medium on which an image is formed (a portion to which ink adheres), an area smaller than the area of the portion, and may or may not adhere to a portion of the recording medium on which no image is formed.

In the post-treatment method, it is preferable that the post-treatment liquid adhere to (or be deposited onto) a portion of the roll sheet Md on which an image is formed. It is more preferable that the post-treatment unit 50 change the amount of discharge (or the amount of adhesion) of the post-treatment liquid and the method of discharging the post-treatment liquid, based on the type, the permeability, the glossiness, and/or the resolution of the recording medium, and/or the amount of adhesion of the pre-treatment liquid (or the amount of liquid) applied by the pre-treatment unit 20.

Further, the post-treatment unit 50 according to the first embodiment is configured to use a recording head similar to that of the image forming unit 40 to discharge the post-treatment liquid onto a target portion in a desired amount (in a desired spot shape or a desired stripe shape). Specifically, the post-treatment unit 50 is configured to select (1) discharging the post-treatment liquid onto an entire area of the roll sheet Md in which an image can be formed: (2) discharging the post-treatment liquid onto an area of the roll sheet Md where an image is formed, (3) discharging the post-treatment liquid onto an area of the roll sheet Md corresponding to an image forming portion (a dot discharge portion), or the like. Alternatively, the post-treatment unit 50 is configured to select (4) discharging the post-treatment liquid onto an area of the roll sheet Md (i.e., the recording medium) larger than the image forming portion. Examples of the area include an area larger than the outer edge of the image forming portion by +1 dot or 2 dots or more. Further, the post-treatment unit 50 is configured to discharge the post-treatment liquid to an area of n % (in a spot shape or a stripe shape) of a selected area to which the post-treatment liquid is to be discharged, where n % may be set to 5% to 50%. The value n may be determined in advance by experiment, numerical calculation, or the like.

The post-treatment unit 50 according to the first embodiment may select a method for discharging the post-treatment liquid, such as (1) discharging the post-treatment liquid based on a print duty, or (2) discharging the post-treatment liquid based on the number of droplets of the post-treatment liquid to be discharged. At this time, the post-treatment unit 50 may calculate a print duty or the number of droplets of the post-treatment liquid from input information (such as print image data) and determine a method for discharging the post-treatment liquid based on the calculated print duty or the like. Accordingly, in the image forming system 100 according to the first embodiment, as compared to the application (discharging) of the post-treatment liquid to the entire surface of the recording medium, the post-treatment unit 50 can be used to deposit (discharge) the post-treatment liquid only in a specific portion of an area where an image is formed. As a result, the time taken for the post-treatment, in particular, the time taken to dry the post-treatment liquid, can be shortened. In addition, the amount of the post-treatment liquid used for the post-treatment can be reduced, and the cost of the post-treatment can be reduced.

The post-treatment method of the post-treatment unit 50 is not limited to any specific method and may be selected as appropriate in accordance with the type of post-treatment liquid. The post-treatment method of the post-treatment unit 50 is more preferably similar to the method for discharging ink in the image forming unit 40, from the viewpoint of a reduction in the size of the image forming apparatus and the storage stability of the post-treatment liquid. Like a recording head of the image forming unit 40, the post-treatment unit 50 preferably includes a liquid discharge head having a plurality of nozzles **40*n*** on a nozzle surface.

The post-treatment liquid to be discharged preferably contains an appropriate amount of water-soluble organic solvent (wetting agent), which is used in the method for discharging ink in the image forming unit 40. In the post-treatment unit 50, it is preferable that the amount of adhesion of the post-treatment liquid after drying be 0.5 $g/m^2$ to 10 $g/m^2$. Examples of the post-treatment liquid include a treatment liquid containing a component that allows a transparent protective layer to be formed on the roll sheet Md (i.e., the recording medium). The treatment liquid containing a component that allows a transparent protective layer to be formed is a treatment liquid containing, for example, a water-dispersible resin, a water-soluble organic solvent (wetting agent), a penetrant, a surfactant, water, and/or other components, as appropriate. Alternatively, the post-treatment liquid may be a resin composition and/or a thermoplastic resin including a component that is polymerized by ultraviolet irradiation. Preferably, the post-treatment liquid is a thermoplastic resin emulsion for improving the glossiness and the fixability. As a result, the post-treatment unit 50 can increase the gloss of the surface of the roll sheet Md on which an image is formed or protect the surface of the roll sheet Md with a resin layer, depending on the method of discharge (application) of the post-treatment liquid.

As in the first embodiment, the use of the post-treatment unit 50 prevents an image (ink) from being peeled (or stripped) from the recording medium by rubbing the surface of the roll sheet Md on which the image is formed with another object (e.g., a roll sheet). That is, scratch resistance (abrasion resistance) can be improved. In addition, quality degradation in an image to be formed, such as bleed-through, density degradation, tone degradation, gloss degradation, and show-through, can be reduced, and issues related to waterfastness, weather-fastness, and other types of fastness of image can also be reduced.

The post-treatment drying unit 80 is a drying apparatus that dries the recording medium with a heated gas in a drying chamber. That is, the post-treatment drying unit 80 can evaporate the moisture of the post-treatment liquid adhering to the roll sheet Md and dry (the post-treatment liquid of) the roll sheet Md. In one example, in the image forming system 100 that does not include the post-treatment unit 50, the post-treatment drying unit 80 is used to dry ink deposited on a recording medium by the image forming unit 40. The details of the post-treatment drying unit 80 will be described below.

The unloading unit 60 unloads (or discharges) the recording medium on which an image is formed. As illustrated in FIG. 1, the unloading unit 60 includes a storage unit 61, a plurality of conveyance rollers 62, and the like. The unloading unit 60 winds the roll sheet Md with an image formed on a front side thereof around a storage roll of the storage unit 61 using the conveyance rollers 62 and the like and stores the roll sheet Md. In some cases, the pressure acting on the roll sheet Md to be wound around the storage roll of the storage unit 61 may be increased. To prevent another image from being transferred to the back side of the roll sheet Md, a drying unit may be disposed to further dry the roll sheet Md immediately before the roll sheet Md is wound. Like the post-treatment drying unit 80, the drying unit may be a drying apparatus that dries the recording medium with a heated gas in a drying chamber.

Next, the configuration and operation of the post-treatment drying unit 80, which is a feature of the present disclosure, will be described.

Figure 4:
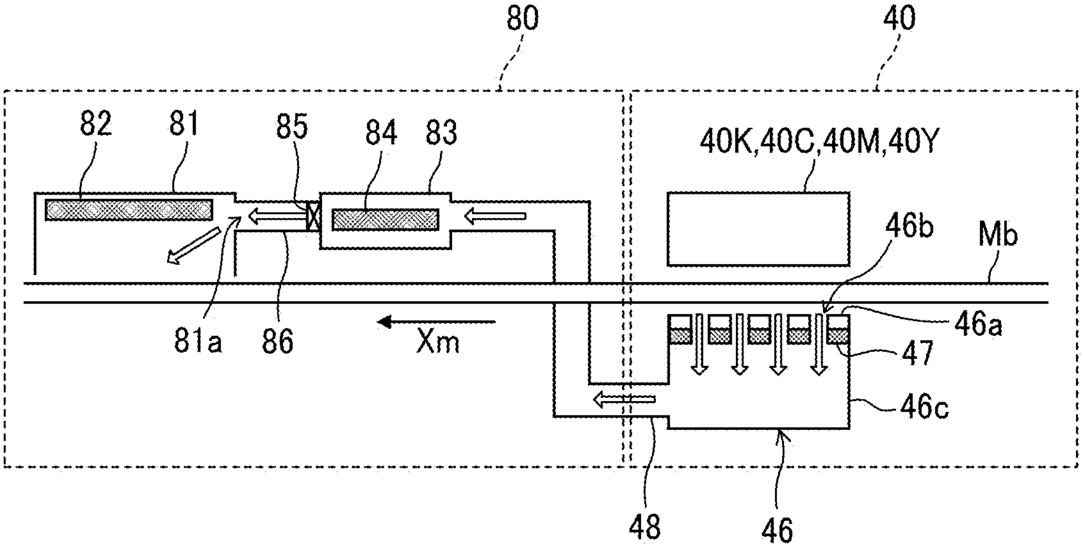
FIG. 4 is a diagram illustrating the schematic configuration of a post-treatment drying unit and the image forming unit in the image forming system according to the first embodiment.

FIG. 4 is a diagram illustrating the schematic configuration of the post-treatment drying unit 80 and the image forming unit 40 according to the first embodiment.

Figure 5:
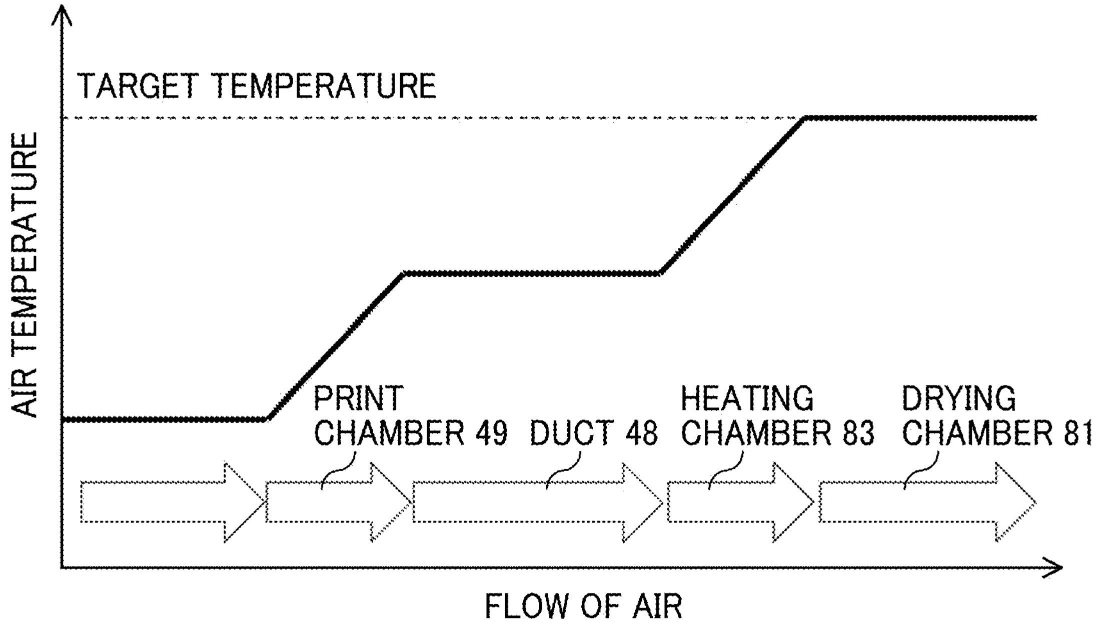
FIG. 5 is a graph illustrating an overview of a flow of air from a suction chamber of the image forming unit to a drying chamber of the post-treatment drying unit and an overview of a change in temperature.

FIG. 5 is a graph illustrating an overview of a flow of air from the sheet retainer 46 of the image forming unit 40 to a drying chamber 81 of the post-treatment drying unit 80 and an overview of a change in temperature.

While the post-treatment unit 50 is disposed between the image forming unit 40 and the post-treatment drying unit 80 in the conveyance direction Xm of the roll sheet Md, the post-treatment unit 50 is not illustrated in FIG. 4 because the post-treatment unit 50 is not related to the drying configuration of the post-treatment drying unit 80.

The post-treatment drying unit 80 heats the air in a heating chamber 83 to a target temperature using a heater 84, and feeds the heated air (heated gas) into the drying chamber 81 to dry the roll sheet Md in the drying chamber 81. For example, the target temperature (preset temperature) is preferably within a range of greater than or equal to 60° C. and less than or equal to 180° C., and more preferably within a range of greater than or equal to 60° C. and less than or equal to 80° C. In the first embodiment, the drying chamber 81 is provided with an adjustment heater 82 to adjust the temperature of the drying chamber 81 to be used for drying. The post-treatment drying unit 80 includes a blower fan 85 for blowing the air in the heating chamber 83 into the drying chamber 81 from an inlet **81*a* of the drying chamber 81. The air fed into the drying chamber 81 by the blower fan 85** is blown onto the roll sheet Md.

In an existing drying apparatus, outside air (outside air of the drying apparatus or outside air of an image forming system including the drying apparatus) is taken into a drying chamber and heated by a heater in the drying chamber to obtain a heated gas whose temperature is increased to a temperature for drying a recording medium. If the temperature of the outside air is low, the beater consumes a large amount of energy to increase the temperature of the outside air to a temperature suitable as a heated gas. In the first embodiment, accordingly, a high-temperature gas (a gas having a higher temperature than the outside air) discharged from the image forming unit 40, more specifically, a high-temperature gas discharged from a suction chamber 46*c* in the sheet retainer 46 of the image forming unit 40, is fed into the drying chamber 81 to reduce the amount of energy to be consumed by the heater 84 in the heating chamber 83 or the adjustment heater 82 in the drying chamber 81.

In the first embodiment, the sheet retainer 46 of the image forming unit 40 sucks and bolds the roll sheet Md so as to prevent the landing positions of the inks discharged from the recording heads 40K, 40C, 40M, and 40Y from being displaced on the roll sheet Md (or prevent the roll sheet Md from floating from the retaining face 46*a* of the sheet retainer 46). As illustrated in FIG. 4, the suction chamber 46*c* of the sheet retainer 46 is coupled to the heating chamber 83 of the post-treatment drying unit 80 through a duct 48. The heating chamber 83 heats the inside air to a target temperature using the heater 84. The heating chamber 83 is in communication with the drying chamber 81 through a duct 86. The duct 86 is provided with the blower fan 85. The blower fan 85 sucks the air (the air heated to the target temperature) in the heating chamber 83 and feeds the sucked air into the drying chamber 81.

The blower fan 85 sucks the air from the heating chamber 83 to create a negative pressure in the heating chamber 83. Accordingly, the air in the suction chamber 46*c* of the sheet retainer 46, which is in communication with the heating chamber 83 through the duct 48, is sucked into the heating chamber 83 through the duct 48. As a result, the inside of the suction chamber 46*c* is brought under a negative pressure, and a suction airflow is generated in the intake holes 46*b* formed in the retaining face 46*a* of the sheet retainer 46 such that external air is sucked into the suction chamber 46*c*. The suction airflow allows the roll sheet Md to be sucked and held on the retaining face 46*a*.

As illustrated in FIG. 4, the sheet retainer 46 according to the first embodiment includes a roll sheet heater 47 on the inner surface of the retaining face 46*a* (inside the suction chamber 46*c*). The roll sheet heater 47 heats the retaining face 46*a* of the sheet retainer 46, and heats the roll sheet Md sucked and held on the retaining face 46*a*. With the roll sheet heater 47, the air in the suction chamber 46*c* is heated to a temperature higher than that of the outside air, as illustrated in FIG. 5.

In the first embodiment, the heated air (the gas having a higher temperature than the outside air) in the suction chamber 46*c* is fed into the heating chamber 83 of the post-treatment drying unit 80 through the duct 48. Thus, the amount of energy consumed by the beater 84 in the heating chamber 83 and the adjustment heater 82 in the drying chamber 81 of the post-treatment drying unit 80 can be made smaller than that in a case where the outside air is fed into the drying chamber 81.

In the related art, the high-temperature air in the sheet retainer 46 is exhausted to the outside of the image forming apparatus through an exhaust duct to prevent temperature rise of the image forming unit 40. In the first embodiment, the high-temperature gas in the suction chamber 46*c*, which is exhausted to the outside of the image forming apparatus in the related art, is used. The high-temperature gas is fed into the drying chamber 81 to reduce the energy consumption for increasing the temperature of the gas in the drying chamber 81 to a desired temperature.

In the first embodiment, the high-temperature gas from the sheet retainer 46 of the image forming unit 40 is not directly fed into the drying chamber 81, but, as illustrated in FIG. 4, is heated by the heater 84 in the heating chamber 83 before being fed into the drying chamber 81. This configuration allows air having a higher temperature to be fed into the drying chamber 81, and can improve the drying function of the post-treatment drying unit 80.

The heating chamber 83 is optional. If the high-temperature gas from the sheet retainer 46 of the image forming unit 40 has a sufficiently high temperature, the high-temperature gas from the sheet retainer 46 of the image forming unit 40 may be fed directly into the drying chamber 81.

Examples of the heater 84 and the adjustment heater 82 in the post-treatment drying unit 80 include a gas heater, a nichrome wire heater, and a ceramic heater.

Second Embodiment

An example of an image forming system including a drying apparatus according to a second embodiment of the present disclosure will be described hereinafter with reference to the drawings.

Figure 6:
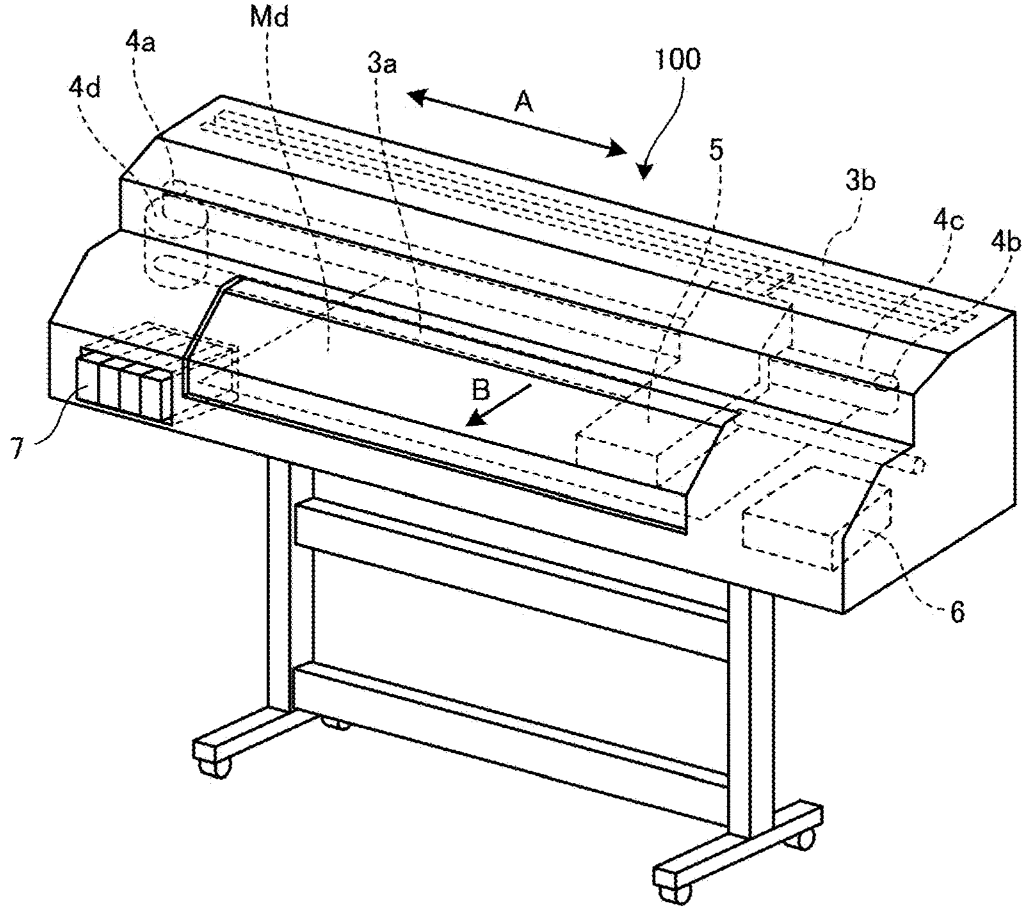
FIG. 6 is a perspective diagram illustrating the external appearance of an image forming system according to a second embodiment of the present disclosure.

FIG. 6 is a perspective diagram illustrating the external appearance of an image forming system 100 according to the second embodiment. The image forming system 100 according to the second embodiment includes a so-called inkjet image forming apparatus. The image forming system 100 according to the second embodiment is configured as a single apparatus (image forming apparatus) and does not have functions corresponding to the pre-treatment unit 20 and the post-treatment unit 50 in the first embodiment described above.

In the image forming system 100, a guide rod 3*a* and an auxiliary guide rail 3*b* are bridged between two side plates. A carriage 5 is held by the guide rod 3*a* and the auxiliary guide rail 3*b* so as to be movable in a direction indicated by an arrow A (a main-scanning direction). The carriage 5 is coupled to a timing belt 4*c* attached to a drive pulley 4*a* and a pressurization pulley 4*b*. The timing belt 4*c* is driven by a main-scanning motor 4*d* through the drive pulley 4*a* such that the carriage 5 reciprocates in the main-scanning direction A. A tensile force is applied to the timing belt 4*c* by the pressurization pulley 4*b*. As a result, the carriage 5 is driven without having a slack.

Figure 7:
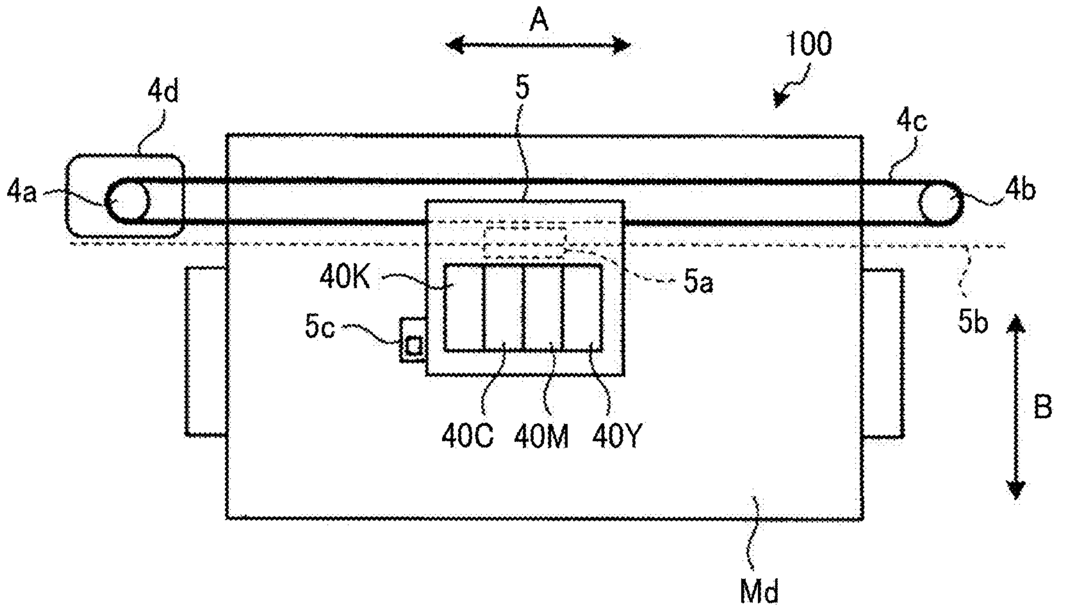
FIG. 7 is a plan view of a carriage scanning mechanism in the image forming system according to the second embodiment.

FIG. 7 is a plan view of a carriage scanning mechanism in the image forming system 100 according to the second embodiment.

In FIG. 7, the roll sheet Md is intermittently conveyed in a direction indicated by an arrow B (a sub-scanning direction) below the carriage 5 that is reciprocating. The recording heads 40K, 40C, 40M, and 40Y discharge ink from a plurality of nozzles onto the roll sheet Md. As a result, a predetermined image, character, or the like is printed on the roll sheet Md. The ink is an example of a liquid. Examples of the ink include, but are not limited to, aqueous ink, ultraviolet (UV) curable ink, electron beam curable ink, and solvent ink.

The image forming system 100 further includes a maintenance mechanism 6 and cartridges 7. The maintenance mechanism 6 performs maintenance of the recording heads 40K, 40C, 40M, and 40Y. The cartridges 7 supply ink to the recording heads 40K, 40C, 40M, and 40Y. The carriage 5 includes an encoder sensor 5*a*. The encoder sensor Sa continuously reads an encoder sheet 5*b* held between the two side plates to detect the position of the carriage 5 in the main-scanning direction. The movement of the carriage 5 between the two side plates is controlled based on the position of the carriage 5 in the main-scanning direction, which is detected by the encoder sensor 5*a*. The carriage 5 is provided with an imaging unit Sc that moves together with the carriage 5. The imaging unit Sc reads color patches of a reference chart and executes a color measurement process for each type of sheet.

Figure 8:
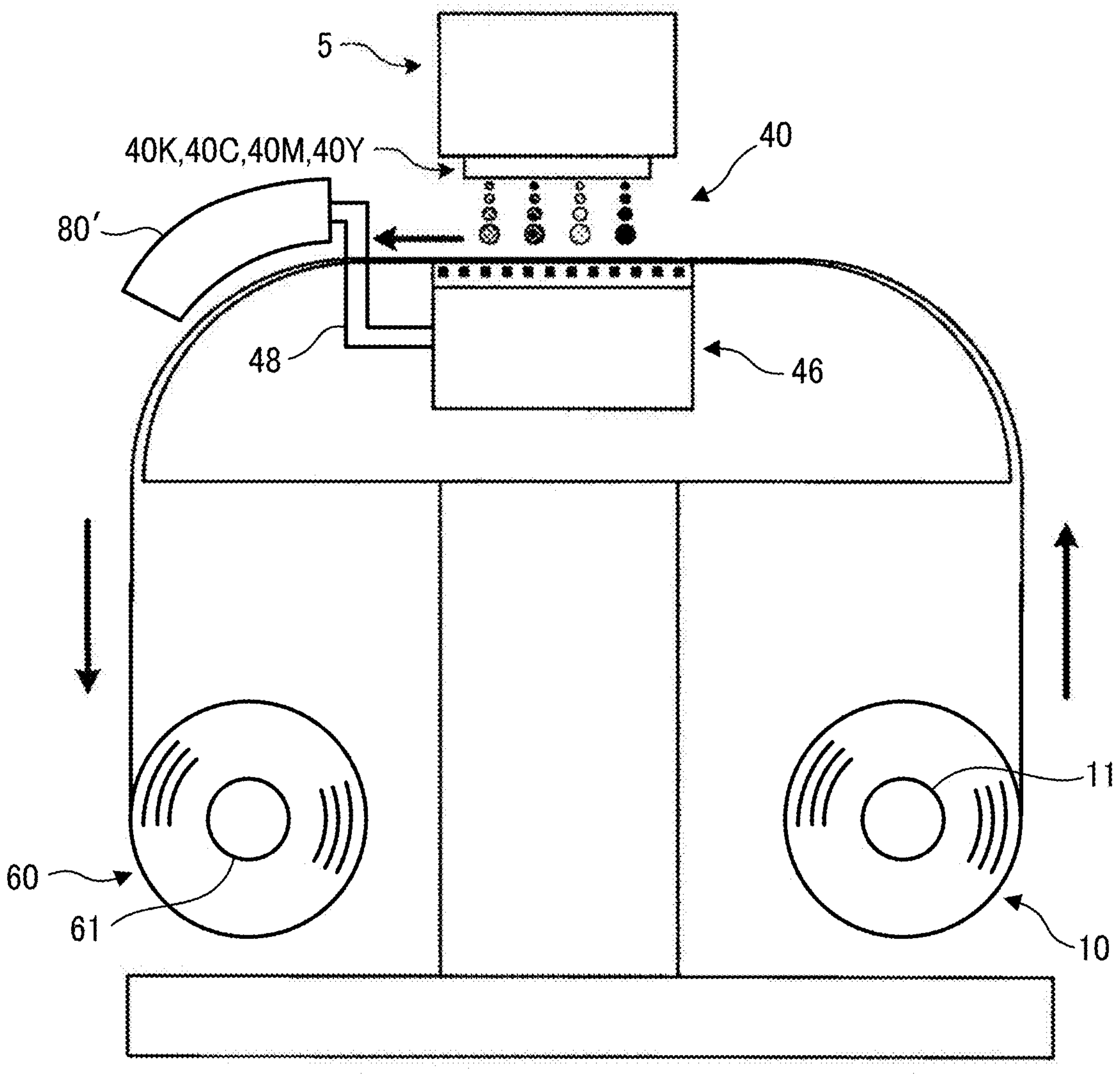
FIG. 8 is a schematic diagram illustrating the internal configuration of the image forming system according to the second embodiment.

FIG. 8 is a schematic diagram illustrating the internal configuration of the image forming system 100 according to the second embodiment.

In the image forming system 100 according to the second embodiment, the image forming unit 40 forms an image on a surface of the roll sheet Md fed by the loading unit 10. In the image forming unit 40, the recording heads 40K, 40C, 40M and 40Y mounted on the carriage 5 perform printing on the roll sheet Md sucked and held on the retaining face 46*a* of the sheet retainer 46. After the roll sheet Md on which the image is formed is dried by a post-printing drying unit 80', the unloading unit 60 winds the roll sheet Md.

The post-print drying unit 80' according to the second embodiment has a configuration similar to that of the post-treatment drying unit 80 according to the first embodiment illustrated in FIG. 4. Also in the second embodiment, a high-temperature gas in the suction chamber 46*c* (see FIG. 4) of the sheet retainer 46, which is exhausted to the outside of the image forming apparatus in the related art, is used. The high-temperature gas is fed into a drying chamber of the post-printing drying unit 80' to reduce the energy consumption for increasing the temperature of the gas in the drying chamber to a desired temperature.

First Modification

A modification of the image forming system 100 according to the first and second embodiments will be described hereinafter. This modification is hereinafter referred to as "first modification." While the first modification will be described as a modification of the image forming system 100 according to the first embodiment described above, the first modification is also applicable to a modification of the image forming system 100 according to the second embodiment.

In response to completion of a printing operation of the image forming system 100, the conveyance of the roll sheet Md is stopped, and the roll sheet Md present in the drying chamber 81 at this time remains in the drying chamber 81. If the temperature in the drying chamber 81 remains high even after the completion of the printing operation, the roll sheet Md is exposed to a high temperature for a long time, and thermal damage (such as deformation) is caused to the roll sheet Md. To address the thermal damage, the first modification provides a configuration for rapidly cooling the temperature in the drying chamber 81 after the printing operation is completed.

Figure 9:
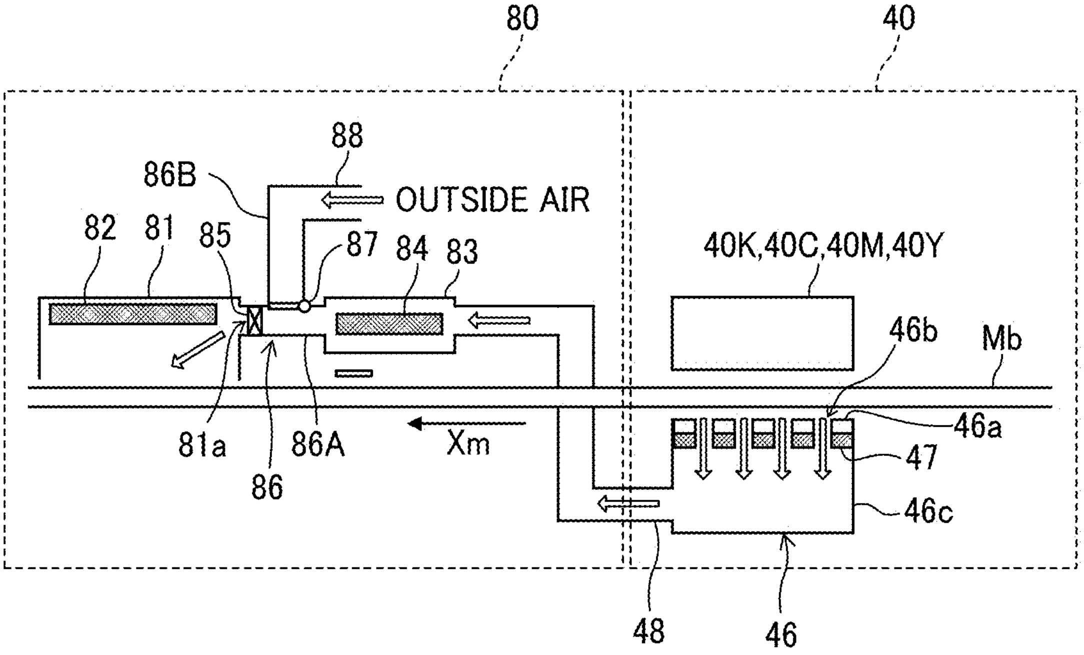
FIG. 9 is a diagram illustrating the schematic configuration of a post-treatment drying unit and an image forming unit of an image forming system according to a first modification of the present disclosure.

FIG. 9 is a diagram illustrating the schematic configuration of a post-treatment drying unit 80 and an image forming unit 40 of the image forming system 100 according to the first modification.

The image forming system 100 according to the first modification has the same basic configuration as that of the first embodiment described above, except that, in the first modification, as illustrated in FIG. 9, the duct 86 of the post-treatment drying unit 80 includes branched two upstream portions (upstream branch paths 86A and 86B) on the upstream side in the airflow direction.

The upstream branch path 86A of the duct 86 is in communication with the heating chamber 83, as in the first embodiment described above. The upstream branch path 86B of the duct 86 is in communication with an outside air duct 88 that takes in outside air. The branch portion of the duct 86 is provided with a flow path switch 87 (e.g., a switching valve). The flow path switch 87 is controlled by the controller 70 to switch whether the drying chamber 81 coupled to the duct 86 on the downstream side in the airflow direction is to communicate with the heating chamber 83 through the upstream branch path 86A or to communicate with the outside air duct 88 through the upstream branch path 86B.

The controller 70 controls the flow path switch 87 to cause the drying chamber 81 coupled to the duct 86 on the downstream side in the airflow direction to communicate with the heating chamber 83 through the upstream branch path 86A during the printing operation. As a result, during the printing operation, the high-temperature gas in the suction chamber 46*c* of the sheet retainer 46 of the image forming unit 40 is fed into the heating chamber 83, and the gas that is further heated in the beating chamber 83 is fed into the drying chamber 81 through the duct 86. Accordingly, as in the first embodiment described above, the energy consumption can be reduced.

In response to the completion of the printing operation, the controller 70 stops the conveyance of the roll sheet Md and controls the flow path switch 87 to cause the drying chamber 81 coupled to the duct 86 on the downstream side in the airflow direction to communicate with the outside air duct 88 through the upstream branch path 86B. As a result, after the completion of the printing operation, the outside air taken from the outside air duct 88 is fed into the drying chamber 81 through the duct 86. Accordingly, the inside of the drying chamber 81 is rapidly cooled, which prevents thermal damage (such as deformation) from being caused to the roll sheet Md remaining in the drying chamber 81.

Second Modification

Another modification of the image forming system 100 according to the first and second embodiments will be described hereinafter. This modification is hereinafter referred to as "second modification." While the second modification will be described as a modification of the image forming system 100 according to the first embodiment described above, the second modification is also applicable to a modification of the image forming system 100 according to the second embodiment.

Figure 10:
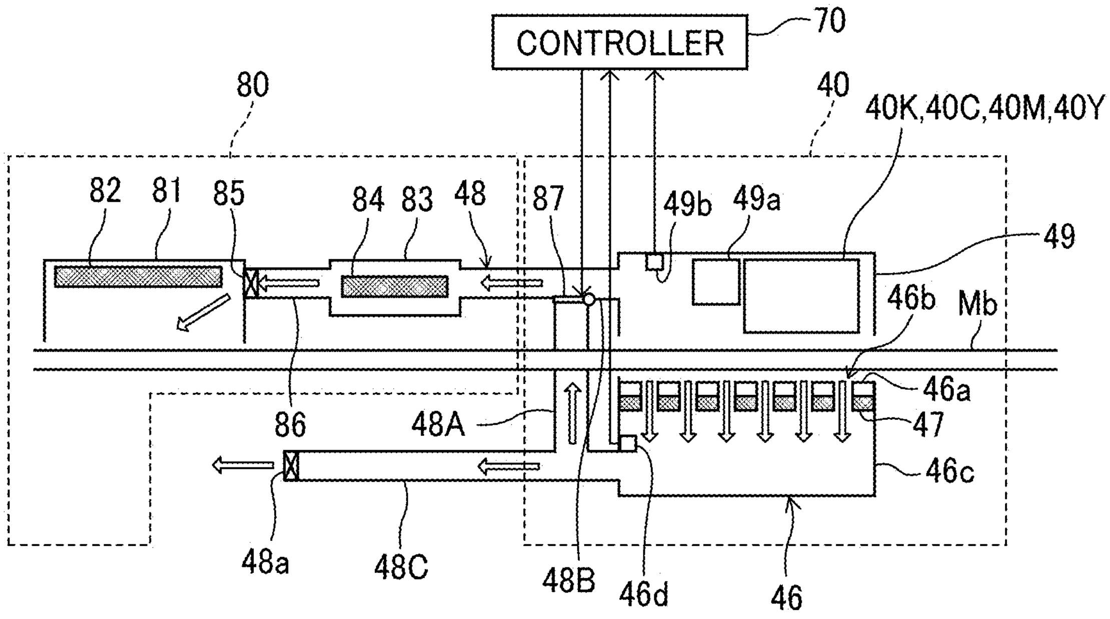
FIG. 10 is a diagram illustrating the schematic configuration of a post-treatment drying unit and an image forming unit of an image forming system according to a second modification of the present disclosure.

FIG. 10 is a diagram illustrating the schematic configuration of a post-treatment drying unit 80 and an image forming unit 40 of the image forming system 100 according to the second modification.

In the second modification, the image forming unit 40 includes a print chamber 49 serving as an image forming chamber. The print chamber 49 accommodates the recording heads 40K, 40C, 40M, and 40Y (image forming engines). The print chamber 49 includes a warm air fan 49*a* to blow warm air onto the roll sheet Md to heat the roll sheet Md. The warm air from the warm air fan 49*a* raises the temperature in the print chamber 49. Like the air in the suction chamber 46*c* of the sheet retainer 46, the air in the print chamber 49 has a higher temperature than the outside air.

The air in the print chamber 49 is fed into the drying chamber 81 of the post-treatment drying unit 80, which may contribute to reduction in energy consumption.

In the image forming system 100 according to the second modification, air having a higher temperature among the air in the print chamber 49 and the air in the suction chamber 46*c* of the image forming unit 40 is fed into the drying chamber 81 of the post-treatment drying unit 80 to further reduce the energy consumption.

The image forming system 100 according to the second modification has the same basic configuration as that of the first embodiment described above, except that, in the second modification, as illustrated in FIG. 10, the duct 48 coupled to the inlet of the heating chamber 83 of the post-treatment drying unit 80 includes two branched portions (upstream branch paths 48A and 48B) on the upstream side in the airflow direction.

The upstream branch path 48A of the duct 48 is in communication with the suction chamber 46*c* of the sheet retainer 46, as in the first embodiment described above. The upstream branch path 48B of the duct 48 is in communication with the print chamber 49. The branch portion of the duct 48 is provided with a flow path switch 87. The flow path switch 87 is controlled by the controller 70 to switch whether the heating chamber 83 coupled to the duct 48 on the downstream side in the airflow direction is to communicate with the suction chamber 46*c* through the upstream branch path 48A or to communicate with the print chamber 49 through the upstream branch path 48B.

The image forming system 100 according to the second modification further includes a print chamber temperature sensor 49*b* and a suction chamber temperature sensor 46*d*. The print chamber temperature sensor 49*b* serves as a first temperature sensor for detecting the temperature in the print chamber 49. The suction chamber temperature sensor 46*d* serves as a second temperature sensor for detecting the temperature in the suction chamber 46*c* of the sheet retainer 46. The temperature detection results of the temperature sensors 49*b* and 46*d* are sent to the controller 70. The controller 70 compares the temperature detection results of the temperature sensors 49*b* and 46*d* during the printing operation. For example, a switching condition is that the temperature of the chamber with which the heating chamber 83 is not in communication (e.g., the suction chamber 46*c*) is higher than the temperature of the chamber with which the heating chamber 83 is currently in communication (e.g., the print chamber 49) by a predetermined temperature (determined by, for example, the manufacturer or system administrator of the mage forming system 100) or higher. When the switching condition is satisfied, the controller 70 controls the flow path switch 87 to switch the flow path. In response to the flow path being switched to the upstream branch path 48B in communication with the print chamber 49 by the flow path switch 87, as illustrated in FIG. 10, the controller 70 operates a suction fan 48*a* to suck the air in the suction chamber 46*c* through a duct 48C to maintain the suction chamber 46*c* at the negative pressure.

According to the second modification, air having a higher temperature among the air in the suction chamber 46*c* and the air in the print chamber 49 can be fed into the heating chamber 83 of the post-treatment drying unit 80. The energy consumed by the post-treatment drying unit 80 can further be reduced.

The configurations described above are examples, and various aspects of the present disclosure provide, for example, the following effects, respectively.

First Aspect

A first aspect provides a drying apparatus including a drying chamber 81 configured to dry a drying-target medium (e.g., the roll sheet Md) with a gas maintained at a preset temperature (target temperature), the drying-target medium being a medium to be dried, the gas maintained at the preset temperature being a gas taken in with the drying-target medium being sucked and held by a sheet retainer 46 including an intake hole 46*b* and a suction chamber 46*c*.

An existing drying apparatus heats taken-in outside air using a heater to obtain a gas (hot air) whose temperature is increased to a preset temperature for drying a drying-target medium to be dried. If the outside air has a low temperature, the amount of energy consumed to increase the temperature of the outside air to a preset temperature for use as warm air is increased.

Accordingly, this aspect employs a configuration in which a gas taken in with the drying-target medium being sucked and held by a medium retainer including an intake hole and a suction chamber is taken into a drying chamber and drying is performed in the drying chamber using the gas. The medium retainer sucks a gas in a medium conveyance path, which is typically higher in temperature than the outside air, and the gas sucked by the medium retainer and discharged from the medium retainer is usually higher in temperature than the outside air. In one example, the medium retainer includes a heater for heating the drying-target medium. Accordingly, in the related art, the gas discharged from the medium retainer is usually exhausted to the outside of the image forming apparatus through an exhaust duct to suppress the internal temperature rise of the image forming apparatus. According to this aspect, the high-temperature gas in the medium retainer, which is exhausted to the outside of the image forming apparatus in the related art, is taken into the drying chamber. This makes it possible to reduce the energy consumed by the heater to increase the temperature of the taken-in gas to a preset temperature for drying the drying-target medium. Alternatively, if the high-temperature gas in the medium retainer has reached the preset temperature for drying the drying-target medium, the beater may be omitted in the drying apparatus, which makes it possible to further reduce the energy consumption.

Second Aspect

A second aspect provides the drying apparatus according to the first aspect, in which the drying chamber has an inlet 81*a* through which the gas discharged from the suction chamber is taken in.

With this configuration, the high-temperature gas discharged from the suction chamber can be taken into the drying chamber.

Third Aspect

A third aspect provides the drying apparatus according to the first or second aspect, further including a heater (e.g., the heater 84 or the adjustment heater 82) configured to heat the gas discharged from the suction chamber.

With this configuration, the drying-target medium can be dried with a gas having a higher temperature.

Fourth Aspect

A fourth aspect provides the drying apparatus according to the third aspect, in which the heater (e.g., the heater 84)

is configured to heat the gas before the gas is taken into the drying chamber (e.g., the drying chamber 81). For example, the heater 84 is in the heating chamber 83 disposed upstream from the drying chamber in the direction in which the gas is taken into the drying chamber.

With this configuration, the heated gas can be fed into the drying chamber, and the drying chamber has less temperature variation. A drying process that achieves uniform drying for the recording medium can be implemented.

Fifth Aspect

A fifth aspect provides the drying apparatus according to the third or fourth aspect, in which the heater is configured to perform heating using a gas heater, a nichrome wire heater, or a ceramic heater.

This configuration can implement an appropriate drying process for the recording medium.

Sixth Aspect

A sixth aspect provides the drying apparatus according to any one of the third to fifth aspects, in which the gas heated by the heater has a temperature in a range of greater than or equal to 60° C. and less than or equal to 80° C.

This configuration can implement an appropriate drying process for the recording medium.

Seventh Aspect

A seventh aspect provides an image forming system 100 including an image forming apparatus (e.g., the image forming unit 40) configured to form an image on a recording medium (e.g., the roll sheet Md), and a drying apparatus (e.g., the post-treatment drying unit 80) including a drying chamber 81 configured to dry the recording medium, in which the drying apparatus is the drying apparatus according to any one of the first to sixth aspects.

This configuration can implement an image forming system with low energy consumption.

Eighth Aspect

An eighth aspect provides the image forming system according to the seventh aspect, in which the drying chamber of the drying apparatus has an inlet Sla through which a gas discharged from an image forming chamber (e.g., the print chamber 49) included in the image forming apparatus and configured to form an image on the recording medium is taken in, and the image forming system further includes a first temperature sensor (e.g., the print chamber temperature sensor 49*b*) configured to detect a temperature in the image forming chamber, a second temperature sensor (e.g., the suction chamber temperature sensor 46*d*) configured to detect a temperature in the suction chamber, and a switching unit (e.g., the controller 70 and the flow path switch 87) configured to switch the gas to be taken into the drying chamber to a gas discharged from one of the image forming chamber and the suction chamber having a higher temperature, based on the temperature detected by the first temperature sensor and the temperature detected by the second temperature sensor. That is, the flow path switch 87 switches a source from which the gas is taken into the drying chamber between the image forming chamber and the suction chamber.

This configuration allows air having a higher temperature to be fed into the drying chamber, and can further reduce the energy consumed by the drying apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A drying apparatus comprising a drying chamber configured to dry a drying-target medium with a gas maintained at a preset temperature, the drying-target medium being a medium to be dried, the drying chamber being configured to take in the gas from a suction chamber into which a gas is sucked in through an intake hole in a retaining face, the retaining face on which the drying-target medium is retained with the gas sucked into the suction chamber.

2. The drying apparatus according to claim 1, wherein the drying chamber includes an inlet configured to take in the gas from the suction chamber.

3. The drying apparatus according to claim 1, further comprising a heater configured to heat the gas from the suction chamber.

4. The drying apparatus according to claim 3, wherein the heater is disposed upstream from the drying chamber in a direction in which the gas is taken into the drying chamber.

5. The drying apparatus according to claim 3, wherein the heater includes one of a gas heater, a nichrome wire heater, and a ceramic heater.

6. The drying apparatus according to claim 3, wherein the heater heats the gas to a temperature range of from 60° C. to 80° C.

7. An image forming system comprising:

an image forming apparatus including:

a medium retainer including the suction chamber and the retaining face; and an image forming engine configured to form an image on a recording medium being the drying-target medium; and the drying apparatus according to claim 1, to dry the recording medium.

8. The image forming system according to claim 7, wherein the image forming apparatus includes an image forming chamber including the image forming engine, wherein the drying chamber includes an inlet configured to take in the gas from the image forming chamber, and wherein the image forming system further comprises:

a first temperature sensor configured to detect a temperature in the image forming chamber;

a second temperature sensor configured to detect a temperature in the suction chamber;

a flow path switch configured to switch a source from which the gas is taken into the drying chamber between the image forming chamber and the suction chamber; and circuitry configured to control the flow path switch to take in the gas from one of the image forming chamber and the suction chamber having a higher temperature, based on the temperature detected by the first temperature sensor and the temperature detected by the second temperature sensor.

* * * * *